United States Patent
Minamino et al.

(10) Patent No.: US 9,495,999 B2
(45) Date of Patent: Nov. 15, 2016

(54) PHASE ERROR DETECTOR AND OPTICAL DISC DEVICE

(71) Applicant: Panasonic Intellectual Property Management Co., Ltd., Osaka (JP)

(72) Inventors: Junichi Minamino, Nara (JP); Kohei Nakata, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/964,614

(22) Filed: Dec. 10, 2015

(65) Prior Publication Data
US 2016/0189745 A1 Jun. 30, 2016

(30) Foreign Application Priority Data

Dec. 26, 2014 (JP) .................................. 2014-263762
Nov. 18, 2015 (JP) .................................. 2015-225394

(51) Int. Cl.

| | | |
|---|---|---|
| *G11B 7/0045* | (2006.01) | |
| *G11B 20/10* | (2006.01) | |
| *G11B 7/09* | (2006.01) | |
| G11B 7/24082 | (2013.01) | |
| G11B 7/005 | (2006.01) | |
| G11B 20/12 | (2006.01) | |
| G11B 7/007 | (2006.01) | |

(52) U.S. Cl.
CPC ......... *G11B 20/1024* (2013.01); *G11B 7/0941* (2013.01); *G11B 7/0053* (2013.01); *G11B 7/24082* (2013.01); *G11B 2007/00754* (2013.01); *G11B 2020/1268* (2013.01)

(58) Field of Classification Search
None
See application file for complete search history.

(56) References Cited

U.S. PATENT DOCUMENTS

2004/0240346 A1* 12/2004 Yoshioka ............. G11B 7/0053
369/47.27

FOREIGN PATENT DOCUMENTS

JP 2008-176832 7/2008

* cited by examiner

*Primary Examiner* — Brian Butcher
(74) *Attorney, Agent, or Firm* — Wenderoth, Lind & Ponack, L.L.P.

(57) ABSTRACT

A phase error detector includes a sine wave generation circuit that generates a sine wave signal, based on a first input signal of a first period, a cosine wave generation circuit that generates a cosine wave signal, based on the first input signal, a first calculator that calculates a phase difference between the sine wave signal and a second input signal of a second period, a second calculator that calculates a phase difference between the cosine wave signal and the second input signal, and a first selection unit that outputs the phase difference calculated by the first calculator when the phase difference calculated by the second calculator is within a predetermined range, and outputs a predetermined value having a same sign as a sign of the phase difference calculated by the first calculator when the phase difference calculated by the second calculator is out of the predetermined range.

6 Claims, 8 Drawing Sheets

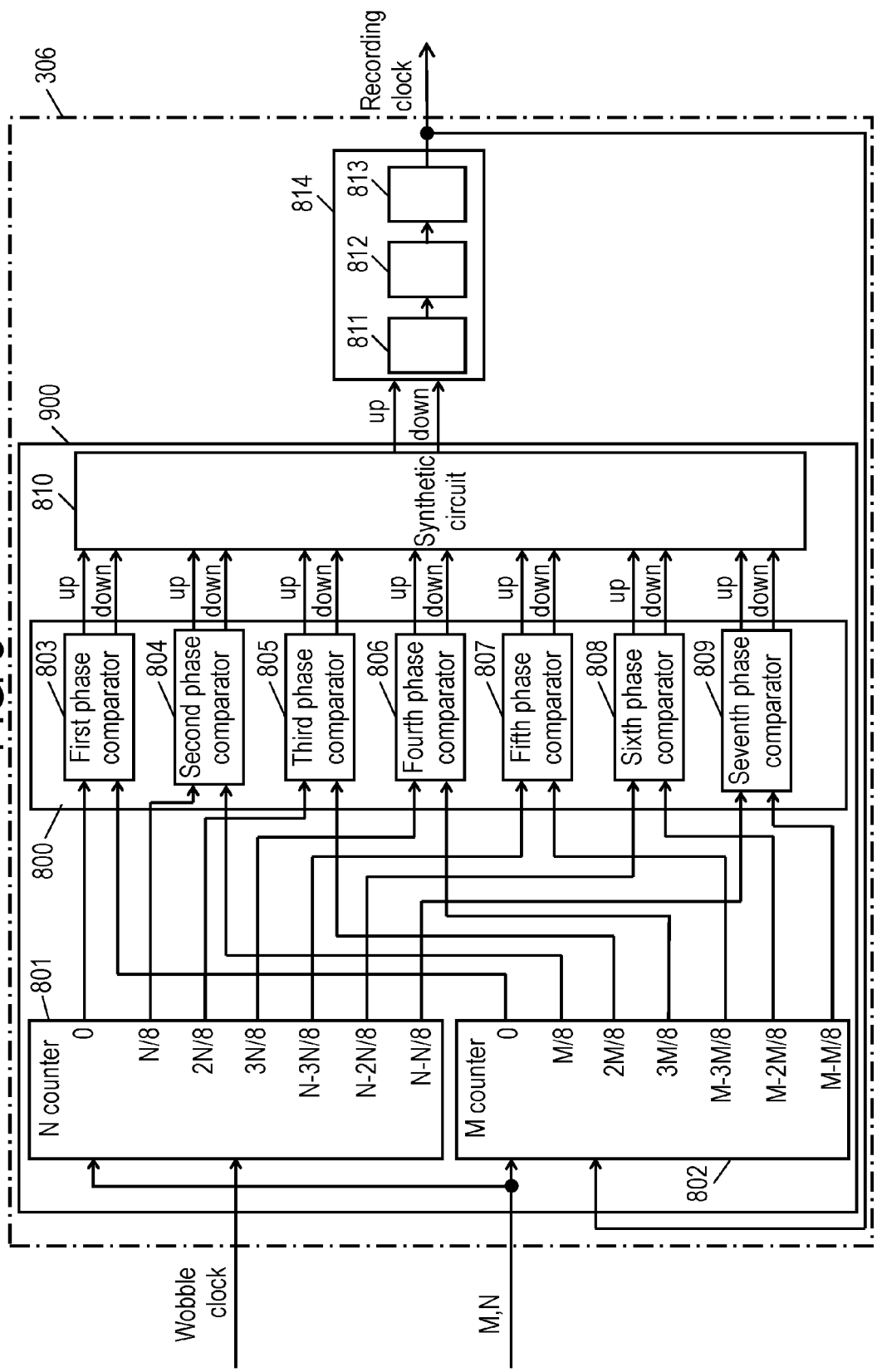

PHASE ERROR DETECTOR AND OPTICAL DISC DEVICE

BACKGROUND OF THE INVENTION

1. Field of the Invention

The present disclosure relates to a phase error detector used in Phase Locked Loop (PLL) circuit, and an optical disc device that detects address and records, using a generated clock.

2. Description of the Related Art

In recent years, recording density of an optical disc goes on increasing. In a field of video technology, optical discs such as a Digital Versatile Disc (DVD) and a Blu-ray (registered trademark) Disc (BD) and the like are well known. These optical discs are used as media for recording video data and also used as external storage media of personal computers. Meanwhile, as external storage media for personal computers, hard disks, flash memories and the like are also used. Compared with such media, the optical disc media have advantages of long life, high reliability, and no power necessity for retaining data.

In view of the advantages, optical disc media attract attention as archive media for storing important data, which is managed by data centers and the like. However, even an optical disc BD-XL which is one of the optical discs having the largest storage capacity, has a storage capacity of 128 GB per one disc. Therefore optical discs are required to store significantly larger space than other external media. Accordingly, it is required to further increase recording density of optical media.

There is a technology of land-and-groove recording which ensures high recording density of optical medium. An optical disc has a guide groove called groove provided for allowing precise control of a light spot to be positioned on a recording track. The technology of land-and-groove recording is for recording user data not only on a groove, but also on a so-called land formed between areas at which the groove is formed. As an optical disc using the technology of land-and-groove recording, DVD-RAM is well known.

Moreover, the optical disc is recorded a physical address associated with its location for recognition of the location to/from which user data is recorded/reproduced. There is a method that uses pre-pits used in the DVD-RAM for forming the physical address. However, since user data cannot be recorded on a portion where the pre-pits are formed, a recording capacity decreases.

In addition, as another method for forming the physical address, there is method which uses a meandering of a track (hereinafter referred to as wobble) and a wobble address is recorded on a wobble. The method which uses wobbles permits detection of the wobble address by a method different from a method of reproducing user data, and thus the recording capacity does not decrease.

In the method using the wobble address, a PLL is used for a reproduction signal of the wobble to generate a clock when data is recorded on the optical disc. The PLL has a phase error detector that detects a phase error, which is a difference between a phase of the reproduction signal of the wobble and a phase of the generated recording clock. The PLL controls the phase of the recording clock to bring the phase error close to zero.

Patent Literature 1 discloses a method for generating a recording clock based on a wobble signal. When the recording clock is generated based on the wobble signal, variation of linear velocity is incurred by eccentricity, motor variation or the like, which causes a residual in the PLL, so that the phase error may be disabled to be sufficiently brought close to zero. In this case, the above-described situation hinders the recording at a precise position on the optical disc. While increasing a loop gain of the PLL can reduce the residuals, the increase in loop gain is accompanied by an increase of an analog circuit such as an increase in a current of a charge pump used in the PLL and the like.

CITATION LIST

Patent Literature

PTL 1: Unexamined Japanese Patent Publication No. 2008-176832

SUMMARY OF THE INVENTION

The present disclosure provides a phase error detector and an optical disc device that reduces a residual of a PLL without adding an analog circuit having a large circuit area.

A phase error detector in the present disclosure includes a sine wave generation circuit configured to generate a sine wave signal, based on a first input signal of a first period, a cosine wave generation circuit configured to generate a cosine wave signal, based on the first input signal, a first calculator configured to calculate a phase difference between the sine wave signal and a second input signal of a second period, a second calculator configured to calculate a phase difference between the cosine wave signal and the second input signal, and a first selection unit configured to output, as a phase error, the phase difference calculated by the first calculator when the phase difference calculated by the second calculator is within a predetermined range, and outputs, as the phase error, a predetermined value having a same sign as a sign of the phase difference calculated by the first calculator when the phase difference calculated by the second calculator is out of the predetermined range.

According to the phase error detector and the optical disc device in the present disclosure, increasing a gain of the phase error detector can reduce a residual of a PLL using the same.

BRIEF DESCRIPTION OF DRAWINGS

FIG. 8 is a block diagram of a synthesizer of the optical disc device in the exemplary embodiment.

DETAILED DESCRIPTION OF THE PREFERRED EMBODIMENT

Figure 1:
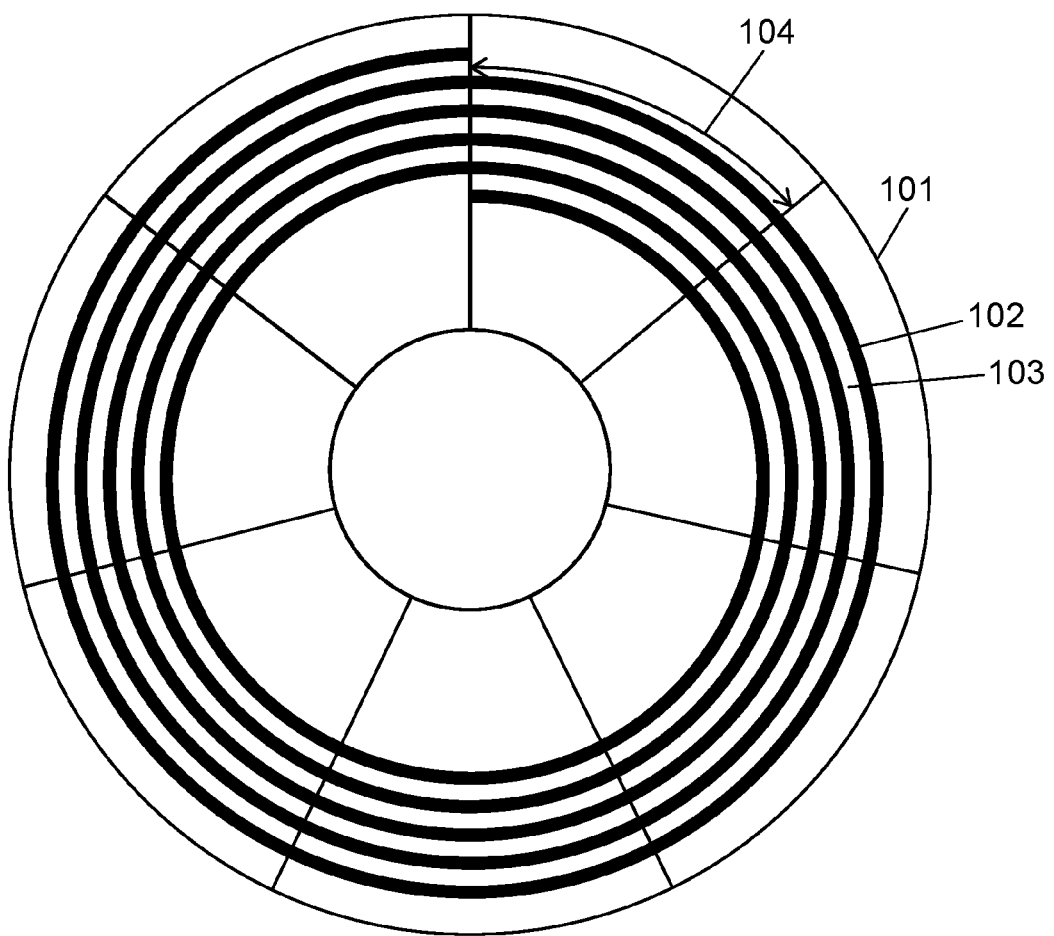
FIG. 1 is a schematic diagram of an optical disc in an exemplary embodiment.

Hereinafter, referring to the drawings as needed, an exemplary embodiment will be described in detail. However, more detailed description than needed may be omitted. For example, detailed description of well-known items or overlapping description of substantially the same configurations may be omitted. This is to avoid making the following description unnecessarily redundant, and to facilitate understanding of those in the art.

The accompanying drawings and the following description are provided for those in the art to sufficiently understand the present disclosure, and these are not intended to limit the subject described in the claims.

Exemplary Embodiment 1

1-1. Configuration of Optical Disc

First, an optical disc on which an optical disc device of the present exemplary embodiment performs recording or reproduction will be described.

FIG. 1 is a schematic diagram of the optical disc on which the recording or reproduction is performed in the optical disc device of the present exemplary embodiment. As shown in FIG. 1, optical disc 101 has groove track (hereinafter, groove) 102 which is formed in a spiral shape. Land track (hereinafter, land) 103 is formed in a portion sandwiched between groove 102 and groove 102. In optical disc 101, groove 102 and land 103 are used as recording tracks.

Groove 102 and land 103 form ADdress In Pre-Groove (ADIP) 104 by radially dividing the track into seven equal parts. ADIP 104 has address information indicating a position in optical disc 101. ADIP 104 is an address information unit in optical disc 101. Since ADIP 104 is formed by radially divided the track, a length of ADIP 104 differs, depending on the position. If a radius at a position where ADIP 104 is disposed is r, the length of ADIP 104 is $2 \times \pi \times r / 7$.

Figure 2:
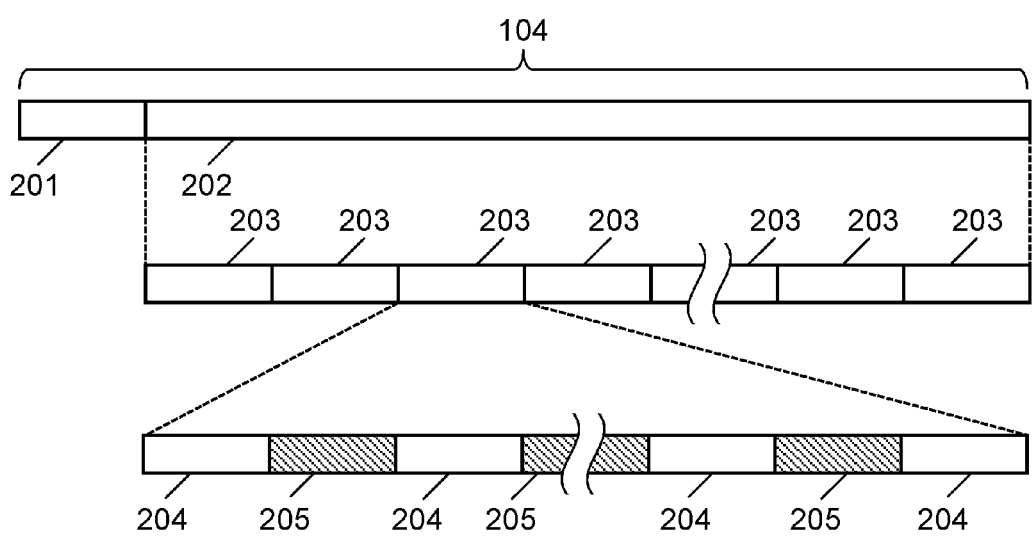
FIG. 2 is a configuration diagram of address information of the optical disc in the exemplary embodiment.

FIG. 2 is a configuration diagram of ADIP 104 as the address information in the present exemplary embodiment. ADIP 104 is configured by synchronization portion 201 and address information portion 202. Synchronization portion 201 is used for detection of timing when the recording or reproduction of the optical disc device is performed. On address information portion 202, the address information is recorded. Address information portion 202 is configured by a plurality of ADIP units 203.

Each ADIP unit 203 is configured by monotone wobble portions 204, and address modulation portions 205. Each monotone wobble portion 204 has a phase of a cosine wave in groove 102. Each address modulation portion 205 is modulated in a predetermined manner, based on 1 bit of information of address modulation portion 205, and has a different phase from the phase of the cosine wave of monotone wobble portion 204. Thus, the optical disc device can detect the address information by detecting address modulation portion 205 having the phase different from the phase of monotone wobble portion 204.

Here, at the time of manufacturing of the optical disc, groove 102 is formed by light beam irradiation. Land 103 is defined as an area sandwiched between adjacent grooves 102. In order to stably reproduce a signal of monotone wobble portion 204 of land 103, grooves 102 adjacent in the radial direction of the optical disc need to be aligned with respect to the phase of the wobble. Thus, the wobble is formed at a predetermined angle. ADIP 104 of optical disc 101 is divided at a predetermined angle and thus grooves 102 are aligned with respect to the phase of the wobble.

In order to align adjacent grooves 102 with respect to the phase, the length of monotone wobble portion 204 is different in accordance with the length of the radius. The optical disc device generates a clock by multiplying a frequency of monotone wobble portion 204. A frequency of the generated clock is multiplied by a rational number (M/N times: M and N are natural numbers) by a synthesizer to generate a clock having a frequency equivalent to a substantially constant physical length. The optical disc device performs recording, using this clock to thereby perform the recording with a substantially constant recording density.

1-2. Configuration of Optical Disc Device

Figure 3:
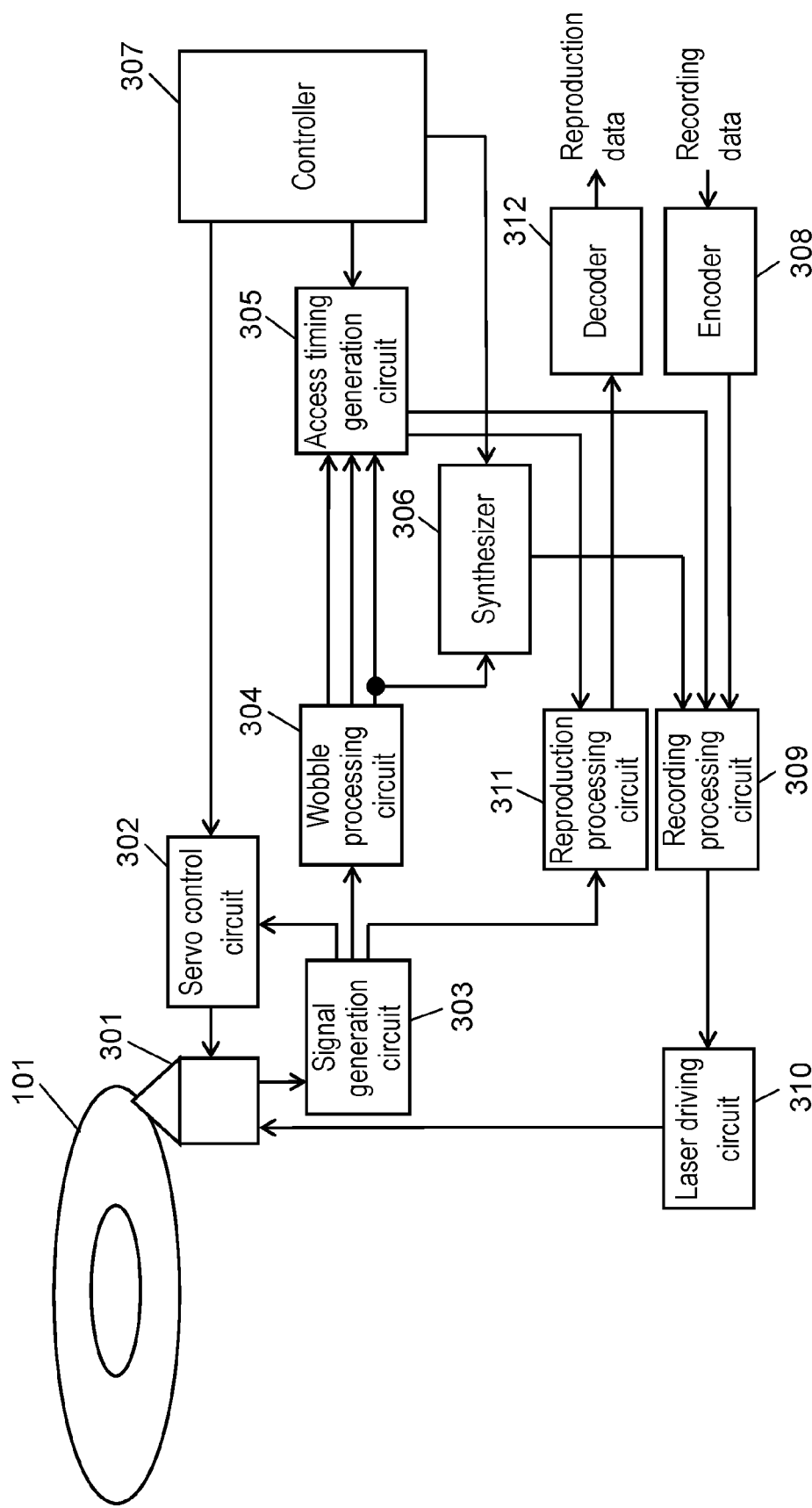
FIG. 3 is a block diagram of the optical disc device in the exemplary embodiment.

Next, a configuration of the optical disc device in the present exemplary embodiment will be described. FIG. 3 is a block diagram of the optical disc device in the present exemplary embodiment. Optical disc device 100 includes optical head 301, servo control circuit 302, signal generation circuit 303, wobble processing circuit 304, access timing generation circuit 305, synthesizer 306, controller 307, encoder 308, recording processing circuit 309, laser driving circuit 310, reproduction processing circuit 311, and decoder 312.

When optical disc 101 is inserted into optical disc device 100, optical head 301 irradiates a light beam on optical disc. Optical head 301 includes a photo detector (not shown). The photo detector is composed of four separate photo detectors which are arranged in four regions divided in a track direction (a tangential direction) and the radial direction. And the light beam is reflected on optical disc 101, and information of the reflected light is converted by the photo detector into an electrical signal.

Signal generation circuit 303 generates a focus error signal, a tracking error signal, a wobble signal, and an addition signal, based on the electric signals output from the photo detector divided into four included in optical head 301.

The focus error signal is, for example, a signal detected by an astigmatic method. The focus error signal is a signal obtained by making two pairs disposed diagonally, adding two signals of each of the pairs, and finding a difference between sums of the two pairs.

The tracking error signal and the wobble signal are signals detected by a push-pull method. A push-pull signal is generated by making two pairs disposed in the tangential direction of the photo detector divided into four, adding two signals of each of the pairs, and finding a difference between sums of the two pairs. The tracking error signal is generated by extracting frequency components in a range from 0 Hz to several tens of kHz from a push-pull signal. The wobble signal is generated by extracting a signal component in a range from several tens of kHz to several MHz from the push-pull signal.

The addition signal is the sum of all the signals from the photo detector divided into four, and indicates a reflected light amount itself from the optical disc.

Servo control circuit 302 collects a light spot on a recording surface by vertically driving an objective lens in optical head 301 so that the focus error signal generated by signal generation circuit 303 becomes 0. Moreover, servo control circuit 302 causes the light spot to track the land or the groove by driving the objective lens in the radial direction so that the tracking error signal generated by signal generation circuit 303 becomes 0. Whether the tracking is to be performed on the land or the groove is decided in accordance with whether to drive the objective lens to an outer circumferential side or an inner circumferential side based on the tracking error signal. This driving direction is decided according to an instruction, which is whether the tracking is to be performed on the land or groove, from controller 307.

Using the wobble signal generated by signal generation circuit 303, wobble processing circuit 304 generates and outputs the wobble clock obtained by multiplying a reproduction signal of monotone wobble portion 204 of optical disc 101, reproduces and outputs the address information, and generates and outputs an address timing signal. Details of wobble processing circuit 304 will be described later. The wobble clock is generated so as to have a period equal to a time obtained by dividing monotone wobble portion 204 by a predetermined value. Thus, when optical disc 101 is scanned at the constant linear velocity, the frequency becomes higher in an inner circumference, and the frequency becomes lower in an outer circumference. And when optical disc 101 is scanned at the constant rotation speed, the frequencies are the same from the inner circumference to the outer circumference.

Synthesizer 306 multiplies the wobble clock generated by wobble processing circuit 304 by the rational number, and converts the wobble clock into a recording clock so as to obtain a substantially constant physical length from the inner circumference to the outer circumference in the scanning of optical disc 101, that is, so as to obtain substantially the same frequency when the scanning is performed at the constant linear velocity. Specifically, synthesizer 306 generates the recording clock so that the frequency thereof becomes N/M times the frequency of the wobble clock, using coefficient M and coefficient N given from controller 307.

Access timing generation circuit 305 generates a timing signal of a recording target address and a timing signal of a reproduction target address indicating timing when recording or reproduction is performed, using the address information, the address timing signal, and the wobble clock generated by wobble processing circuit 304.

Reproduction processing circuit 311 extracts binary data as user data from the addition signal generated by signal generation circuit 303 in accordance with the timing signal of the reproduction target address generated by access timing generation circuit 305.

Decoder 312 demodulates the binary data extracted in reproduction processing circuit 311 to perform error correction and output the resultant as reproduction data.

Encoder 308 receives recording data as the user data to add an error correction code, and modulate the resultant to binary data.

Recording processing circuit 309 commands light emission of a recording power in accordance with the binary data to laser driving circuit 310, based on the recording clock generated by synthesizer 306, and the timing signal of the recording target address generated by access timing generation circuit 305.

Laser driving circuit 310 drives optical head 301 in accordance with the light emission command of the recording power by recording processing circuit 309. This allows optical head 301 to irradiate optical disc 101 with the light beam with the recording power, which is stronger than the power during reproduction, to perform recording in accordance with the binary data on optical disc 101.

1-3. Configuration of Wobble Processing Circuit

Figure 4:
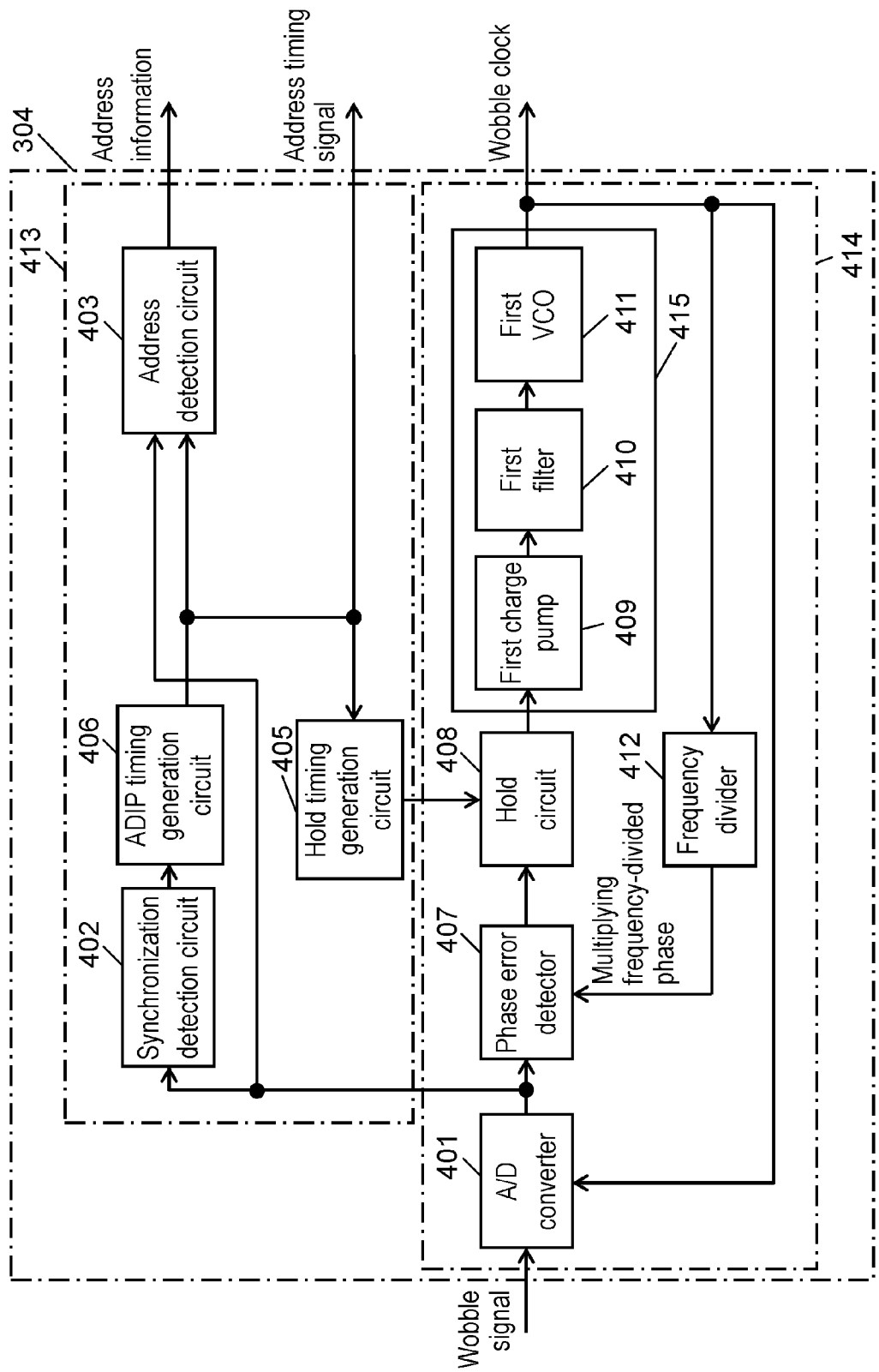
FIG. 4 is a block diagram of a wobble processing circuit of an optical disc device in the exemplary embodiment.

Next, a detailed configuration of wobble processing circuit 304 will be described. FIG. 4 is a block diagram of wobble processing circuit 304. Wobble processing circuit 304 includes ADIP detection circuit 413 and PLL 414.

PLL 414 generates the wobble clock from the wobble signal by multiplying a frequency of the wobble signal. PLL 414 includes A/D convertor 401, phase error detector 407, hold circuit 408, clock generator 415, and frequency divider 412.

Clock generator 415 is configured by first charge pump 409, first filter 410, and first Voltage Controlled Oscillator (VCO) 411.

ADIP detection circuit 413 includes synchronization detection circuit 402, ADIP timing generation circuit 406, hold timing generation circuit 405, and address detection circuit 403. ADIP detection circuit 413 generates and outputs the address information and the address timing signal from a digital wobble signal.

A/D convertor 401 digitalizes the wobble signal with a sampling period by the wobble clock, and outputs the resultant as the digital wobble signal to phase error detector 407, and synchronization detection circuit 402 and address detection circuit 403 of ADIP detection circuit 413.

Frequency divider 412 frequency-divides the wobble clock by 24, and outputs, to phase error detector 407, a multiplying frequency-divided phase, which is a signal indicating a phase in one period after frequency-dividing the wobble clock by 24. The multiplying frequency-divided phase is a signal that increases from −12 to 11 one by one every wobble clock, and returns to −12 after 11. A period of the multiplying frequency-divided phase is equal to 24 times as long as the period of the wobble clock.

Phase error detector 407 detects and outputs a phase error between a wobble carrier component included in the digital wobble signal output by A/D converter 401, and the multiplying frequency-divided phase.

Synchronization detection circuit 402 detects synchronization portion 201 of optical disc 101 from the digital wobble signal.

ADIP timing generation circuit 406 generates the address timing signal that specifies a position of synchronization portion 201 in ADIP 104, based on timing when synchronization portion 201 is detected.

Address detection circuit 403 specifies timing when address modulation unit 205 is detected in accordance with the address timing signal generated by ADIP timing generation circuit 406, determines whether the address information is "0" or "1", tallies a determination result, performs error correction, and outputs the resultant as the address information.

Hold timing generation circuit 405 outputs, as a hold timing signal, a signal specifying the timing of address modulation portion 205 with the wobble modulated in accordance with the address timing signal generated by ADIP timing generation circuit 406. The hold timing signal is a signal that becomes "1" at the timing of address modulation portion 205, and becomes "0" at other times.

Hold circuit 408 outputs a value held inside as a phase error when the hold timing signal indicates the timing of address modulation portion 205, and outputs the phase error output by phase error detector 407 at other times.

First charge pump 409 injects or draws a current, in accordance with output of hold circuit 408.

First filter 410 smoothes current injection or drawing operation by first charge pump 409 to output the resultant as a voltage.

First VCO 411 outputs the wobble clock of a frequency in accordance with the voltage output by first filter 410.

PLL 414 may have a configuration not including hold circuit 408.

1-4. Configuration of Phase Error Detector

Figure 5:
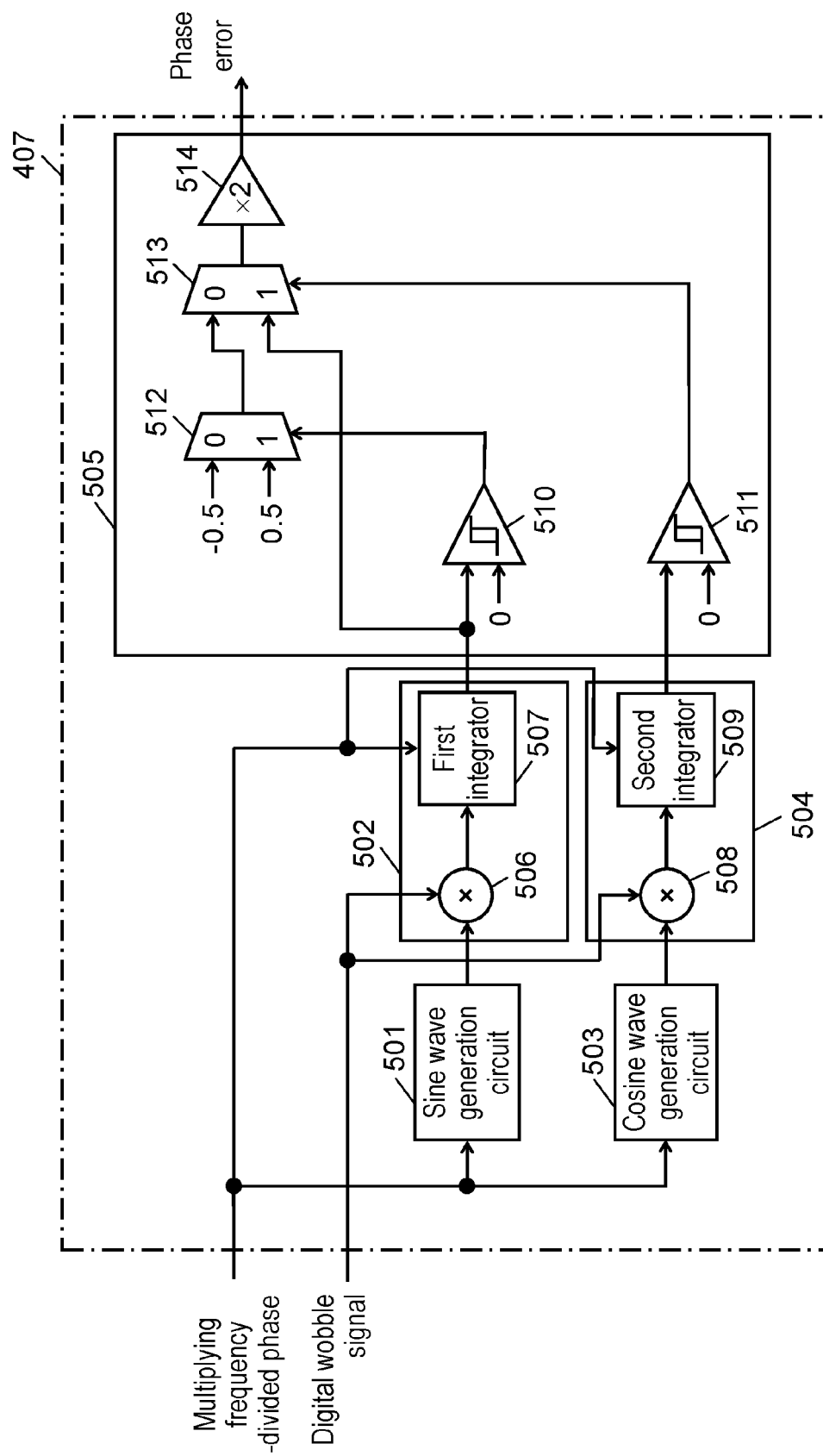
FIG. 5 is a block diagram of a phase error detector of the optical disc device in the exemplary embodiment.

Next, a detailed configuration of phase error detector 407 will be described. FIG. 5 is a block diagram of phase error detector 407. Phase error detector 407 includes sine wave generation circuit 501, first calculator 502, cosine wave generation circuit 503, second calculator 504, and first selection unit 505.

First calculator 502 is configured by first multiplier 506 and first integrator 507. Second calculator 504 is configured by second multiplier 508 and second integrator 509. First selection unit 505 is configured by first comparator 510, second comparator 511, first selector 512, second selector 513, and amplifier 514.

Sine wave generation circuit 501 generates a sine wave signal, based on the input multiplying frequency-divided phase. Since the multiplying frequency-divided phase changes in a range from −12 to 11, sine wave generation circuit 501 outputs the following as the sine wave signal.

$$\sin(2 \times \pi \times \text{multiplying frequency-divided phase}/24)$$

First multiplier 506 multiplies the wobble carrier component of the digital wobble signal by the sine wave signal, and outputs the resultant.

First integrator 507 integrates the output of first multiplier 506 with respect to a section of timing 0 to −1 of the multiplying frequency-divided phase, which is equivalent to one period of the multiplying frequency-divided phase, that is, one period of the wobble (24 periods of the wobble clock).

In the above-described configuration, phase difference detection is performed by so-called heterodyne detection. A phase difference between a cosine wave component of monotone wobble portion 204 included in the wobble signal, and the multiplying frequency-divided phase is defined as α. At this time, multiplication of cosine wave component $\cos(x)$ and sine wave signal $\sin(x+\alpha)$ generated by sine wave generation circuit 501 is $$\cos(x) \times \sin(x+\alpha) = (\sin(2x+\alpha) + \sin(\alpha))/2.$$

In the integration of one period by first integrator 507, an integration result of a $\sin(2x+\alpha)$ term is 0, and thus, only a $\sin(\alpha)/2$ term remains. $\sin(\alpha)/2$, which is the result of the heterodyne detection, is a sine function of phase difference α, and thus, when phase difference α is in a range from −90 degrees to 90 degrees, the detection result of the phase error monotonically increases with respect to phase difference α, while in a range from −180 degrees to −90 degrees and in a range from +90 degrees to +180 degrees, the detection result of the phase error monotonically decreases.

First comparator 510 outputs "1" when the output of first integrator 507 is positive, and outputs "0" when the output of first integrator 507 is negative.

First selector 512 outputs 0.5 when the output of first comparator 510 is "1", and outputs −0.5 when the output of first comparator 510 is "0". That is, first selector 512 outputs 0.5 when the output of first integrator 507 is positive, and outputs −0.5 when the output of first integrator 507 is negative.

Cosine wave generation circuit 503 outputs the following as a cosine wave signal based on the input multiplying frequency-divided phase.

$$\cos(2 \times \pi \times \text{multiplying frequency-divided phase}/24)$$

Second multiplier 508 multiplies the digital wobble signal by the cosine wave signal and outputs the resultant.

Second integrator 509 integrates the output of second multiplier 508 with respect to the section of timing 0 to −1 of the multiplying frequency-divided phase equivalent to one period of the multiplying frequency-divided phase, that is, one period of the wobble (in 24 periods of the wobble clock).

Second comparator 511 outputs "1" when the output of second integrator 509 is positive, and outputs "0" when the output of second integrator 509 is negative.

Second selector 513 outputs the output of first integrator 507 when the output of second comparator 511 is "1", and outputs the output of first selector 512 when the output of second comparator 511 is "0". Amplifier 514 doubles and outputs the input signal.

Here, the phase difference between the cosine wave component of monotone wobble portion 204 included in the wobble signal and the multiplying frequency-divided phase is defined as α. Multiplication of cosine wave component $\cos(x)$ and cosine wave signal $\cos(x+\alpha)$ generated by cosine wave generation circuit 503 is $$\cos(x) \times \cos(x+\alpha) = \cos(\alpha)/2.$$

Accordingly, the output of second comparator 511 is "1" when the phase difference is in a range from −90 degrees to +90 degrees, and is "0" when the phase difference is in a range from −180 degrees to −90 degrees, and in a range from +90 degrees to +180 degrees.

Figure 6:
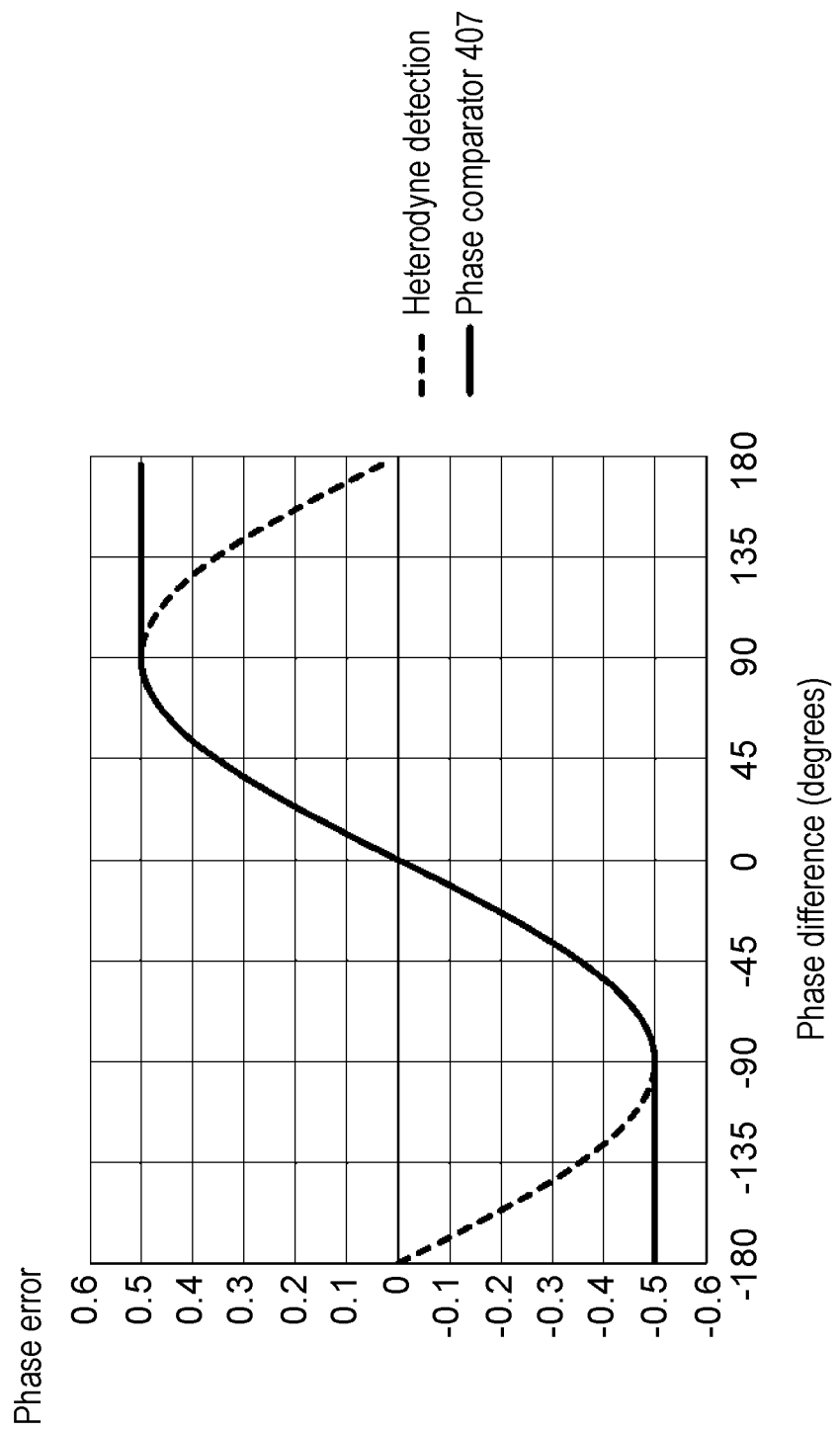
FIG. 6 is a graph showing phase error output with respect to a phase difference of the phase error detector in the exemplary embodiment.

Second selector 513 outputs the output of first integrator 507 when the output of second comparator 511 is "1", that is, when phase difference α is in the range from −90 degrees to +90 degrees. Moreover, second selector 513 outputs −0.5 when the output of second comparator 511 is "0" and the output of first comparator 510 is "0", that is, when phase difference α is in the range from −180 degrees to −90 degrees. Moreover, second selector 513 outputs +0.5 when the output of second comparator 511 is "0" and the output of first comparator is "1", that is, when the phase difference α is in the range from +90 degrees to +180 degrees. FIG. 6 is a graph showing phase error output with respect to the phase difference of phase error detector 407. In FIG. 6, the phase error with respect to the phase difference in phase error detector 407 is indicated by the solid line, and for comparison, the phase error with respect to the phase difference in heterodyne detection, that is, the output of first integrator 507 is indicated by the broken line.

That is, first selection unit 505 outputs, as the phase error, a phase difference calculated by first calculator 502 when a phase difference calculated by second calculator 504 is within a predetermined range, and outputs, as the phase error, a value that has the same sign as the sign of the phase difference calculated by first calculator 502, and has a predetermine absolute value when the phase difference calculated by second calculator 504 is out of the predetermined range.

1-5. Configuration of Hold Circuit

Figure 7:
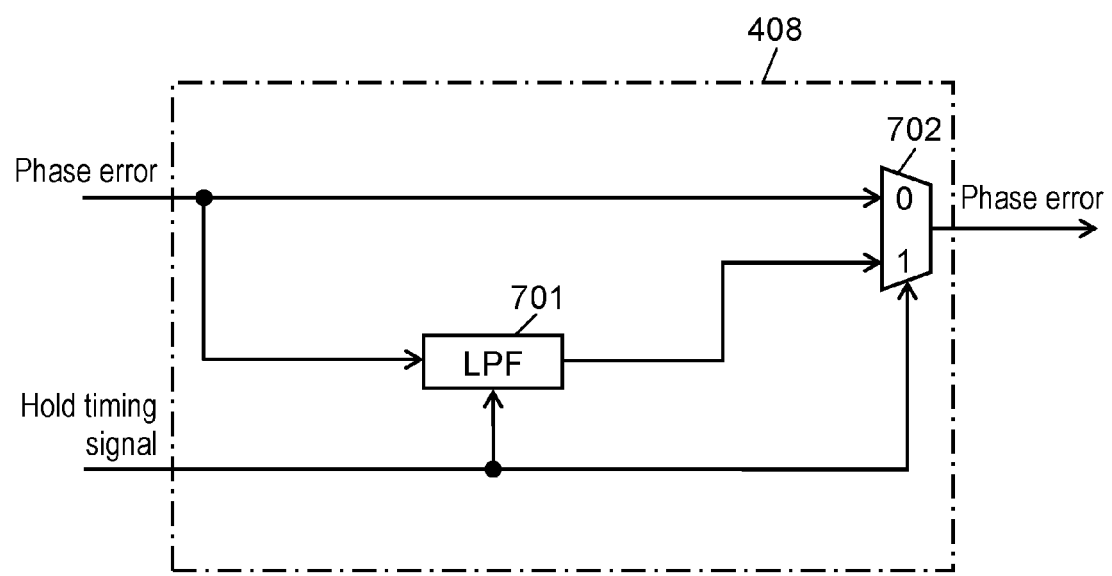
FIG. 7 is a block diagram of a hold circuit of the optical disc device in the exemplary embodiment.

Next, a detailed configuration of hold circuit 408 will be described. FIG. 7 is a block diagram of hold circuit 408. Hold circuit 408 includes Low-Pass Filter (LPF) 701 and third selector 702.

The hold timing signal is a signal that is "1" at the timing of address modulation portion 205, and that is "0" at other timing. When the hold timing signal is "0", third selector 702 selects the phase error of an input signal and outputs the phase error. When the hold timing signal is "1", third selector 702 selects output of LPF 701 and outputs the output of LPF 701 as the phase error. That is, the phase error of phase error detector 407 is almost 0 at the timing of address modulation portion 205 when the hold timing signal is "1", and a gain is decreased, and thus, the output of phase error detector 407 is not used, but the output of LPF 701 is used to suppress the decrease of gain.

LPF 701 smoothes and outputs the phase error while the hold timing signal is "0". When the hold timing signal is "1", LPF 701 holds and outputs the output smoothed value immediately before. That is, when the hold timing signal is "1", third selector 702 continues to output the value obtained by smoothing the phase error immediately before the hold timing signal changes from "0" to "1". In the phase error smoothed in LPF 701, a residual of a cutoff frequency of LPF 701 or lower passes. Thus, even when the phase error passing LPF 701 is held and output, PLL 414 can be operated while suppressing the residual. Accordingly, even if a ratio of address modulation portion 205 is large, and an incidence when PLL 414 is held is high, gain decrease in low frequencies in PLL 414 can be suppressed.

1-6. Configuration of Synthesizer

Next, a detailed configuration of synthesizer 306 will be described. FIG. 8 is a block diagram of synthesizer 306. Synthesizer 306 includes phase error detector 900 and clock generator 814.

Phase error detector 900 is configured by N counter 801, M counter 802, comparator 800, and synthetic circuit 810.

Comparator 800 is configured by first phase comparator 803, second phase comparator 804, third phase comparator 805, fourth phase comparator 806, fifth phase comparator 807, sixth phase comparator 808, and seventh phase comparator 809.

Clock generator 814 is configured by second charge pump 811, second filter 812, and second VCO 813.

N counter 801 receives coefficient N from controller 307, and counts the wobble clock from 0 to N−1 to divide the wobble clock by N. At this time, a timing signal is output each time a counter value becomes 0, N/8, 2N/8, 3N/8, N−3N/8, N−2N/8, and N−N/8.

Since the counter value is an integer, the respective values to be compared need to be integers as well, and the respective values are performed by simple arithmetic operation of bit shift, and addition or subtraction, and thus, a fractional part of each of the values is truncated. Moreover, here, after N/8 is arithmetically operated, the arithmetical operation of integral multiple is performed. Accordingly, for example, when N=99, N/8 is 12, 2N/8 is 24, 3N/8 is 36, and N−3N/8 is 63, N−2N/8 is 75, and N−N/8 is 87.

Similarly, M counter 801 receives coefficient M from controller 307, and counts the recording clock as output of second VCO 813 from 0 to M−1 to divide the recording clock by M. At this time, a timing signal is output each time a counter value becomes 0, M/8, 2M/8, 3M/8, M−3M/8, M−2M/8, and M−M8.

As in the case in the N counter, since the counter value is an integer, the respective values to be compared need to be integers as well, and the respective values are performed by simple arithmetic operation of bit shift, and addition or subtraction, and thus, a fractional part of each of the values is truncated. Moreover, here, after M/8 is arithmetically operated, the arithmetical operation of integral multiple is performed.

From first phase comparator 803 to seventh phase comparator 809, these comparators perform common operation except that the values of the input signals are different from each other. Each comparator, from first phase comparator 803 to seventh phase comparator 809, compares the phase of the timing signal from N counter 801 and the phase of the timing signal from M counter 802, and outputs an up-pulse or a down-pulse in accordance with a comparison result. That is, when a rising edge of the timing signal from N counter 801 is output earlier than a rising edge of the timing signal from M counter 802, each comparator, from first phase comparator 803 to seventh phase comparator 809, outputs the up-pulse in a period from the rising edge of the signal from N counter 801 to the rising edge of the signal from M counter 802. In contrast, when the rising edge of the timing signal from M counter 802 is output earlier than the rising edge of the timing signal from N counter 801, each comparator, from first phase comparator 803 to seventh phase comparator 809, outputs the down-pulse in a period from the rising edge of the signal from M counter 802 to the rising edge of the signal from N counter 801.

Specifically, first phase comparator 803 compares the phase of the timing signal indicating the N counter=0, and the phase of the timing signal indicating the M counter=0. Second phase comparator 804 compares the phase of the timing signal indicating the N counter=N/8, and the phase of the timing signal indicating the M counter=M/8. Third phase comparator 805 compares the phase of the timing signal indicating the N counter=2N/8, and the phase of the timing signal indicating the M counter=2M/8. Fourth phase comparator 806 compares the phase of the timing signal indicating the N counter=3N/8, and the phase of the timing signal indicating the M counter=3M/8. Fifth phase comparator 807 compares the phase of the timing signal indicating the N counter=N−3N/8, and the phase of the timing signal indicating the M counter=M−3M/8. Sixth phase comparator 808 compares the phase of the timing signal indicating the N counter=N−2N/8, and the phase of the timing signal indicating the M counter=M−2M/8. Seventh phase comparator 809 compares the phase of the timing signal indicating the N counter=N−N/8, and the phase of the timing signal indicating the M counter=M−M/8.

Each comparator, from first phase comparator 803 to seventh phase comparator 809, performs phase comparison between the phase when the value of the N counter is 0, and the phase when the value of the M counter is 0, and phase comparison between the phase when the value of the N counter is equal to the value obtained by dividing N into a substantially predetermined value, and the phase when the value of the M counter is equal to the value obtained by dividing M into a substantially predetermined value.

Synthetic circuit 810 generates a signal indicating the phase error, based on all comparative results of from first phase comparator 803 to seventh phase comparator 809. That is, synthetic circuit 810 fixes the output down-pulse to "0" when first phase comparator 803 outputs the up-pulse, and outputs, as the down-pulse, a logical sum of the down-pulses of from first phase comparator 803 to seventh phase comparator 809 when first phase comparator 803 does not output the up-pulse. Similarly, synthetic circuit 810 fixes the output up-pulse to "0" when first phase comparator 803 outputs the down-pulse, and outputs, as the up-pulse, a logical sum of the up-pulses of from first phase comparator 803 to seventh phase comparator 809 when first phase comparator 803 does not output the down-pulse. When in the above-described phase comparison, phase shift between N counter 801 and M counter 802 is a predetermined shift or larger, PLL 414 is locked, using the phase comparison result of first phase comparator 803. On the other hand, when the phase error is within a predetermined range or smaller, all comparators of from first phase comparator 803 to seventh phase comparator 809 are used.

Unless N and M are multiples of 8, residuals of the phase error occur due to truncate the decimal point of N/8 and M/8 in the phase comparison. For example, if N=99 and M=98, 99/8=12.375 and 98/8=12.25. Accordingly, the phase comparison when N=12 and M=12 is performed. Thus, the phase comparison between 12/99=about 0.1212 periods and 12/98=about 0.1224 periods is performed, and a residual of 0.1224−0.1212=0.0012 periods occurs. While this residual appears as an offset in a loop of PLL 414, the offset of −0.0012 periods occurs in the phase comparison between N−N/8 and M−M/8. Thus, the phase comparison between N/8 and M/8, and the phase comparison between N−N/8 and M−M/8 are simultaneously performed, which cancels the residual, and suppresses the production of a total of offset in the whole loop of PLL 414.

Second charge pump 811 injects a current in accordance with the up-pulse of synthetic circuit 810, and draws the current in accordance with the down-pulse.

Second filter 812 smoothes current injection or drawing operation in second charge pump 811 to output the resultant as a voltage.

Second VCO 813 outputs the recording clock of a frequency in accordance with the output voltage of second filter 812.

As described above, while the phase comparison is performed only in the phase 0 in the conventional art, synthesizer 306 performs the phase comparison in the total of 7 phases to inject or draw the current in each of the phases, by which a phase comparison gain can be septupled without increase in charge pump current accompanied by increase in circuit size.

1-7. Effects and the Like

As described above, a phase error detector of the present disclosure includes a sine wave generation circuit configured to generate a sine wave signal, based on a first input signal of a first period, a cosine wave generation circuit configured to generate a cosine wave signal, based on the first input signal, a first calculator configured to calculate a phase difference between the sine wave signal and a second input signal of a second period, a second calculator configured to calculate a phase difference between the cosine wave signal and the second input signal, and a first selection unit configured to outputs, as a phase error, the phase difference calculated by the first calculator when the phase difference calculated by the second calculator is within a predetermined range, and outputs, as the phase error, a predetermined value having a same sign as a sign of the phase difference calculated by the first calculator when the phase difference calculated by the second calculator is out of the predetermined range.

Thus, there can be provided a phase error detector that can detect a phase error properly even when the phase difference is large.

What is claimed is:

1. A phase error detector comprising:
   a sine wave generation circuit configured to generate a sine wave signal, based on a first input signal of a first period;
   a cosine wave generation circuit configured to generate a cosine wave signal, based on the first input signal;
   a first calculator configured to calculate a phase difference between the sine wave signal and a second input signal of a second period;
   a second calculator configured to calculate a phase difference between the cosine wave signal and the second input signal; and
   a first selection unit configured to output, as a phase error, the phase difference calculated by the first calculator when the phase difference calculated by the second calculator is within a predetermined range, and outputs, as the phase error, a predetermined value having a same sign as a sign of the phase difference calculated by the first calculator when the phase difference calculated by the second calculator is out of the predetermined range.

2. The phase error detector according to claim 1, wherein the predetermined value is an absolute value of a maximum value or a minimum value of the phase difference calculated by the first calculator.

3. The phase error detector according to claim 1, wherein the predetermined range is a range from −90 degrees to +90 degrees.

4. The phase error detector according to claim 1, comprising:
   a timing generation circuit configured to output a timing signal "1" when the phase error as the output of the first selection unit is substantially 0, and outputs a timing signal "0" when the phase error as the output of the first selection unit is not substantially 0;
   a low-pass filter configured to output a value obtained by smoothing the phase error output by the first selection unit when the timing signal is "0", and hold and output the value obtained by smoothing the phase error when the timing signal is "1", and
   a second selection unit configured to output input from the low-pass filter when the timing signal is "1", and outputs the phase error output by the first selection unit when the timing signal is "0".

5. An optical disc device comprising:
   a sine wave generator configured to generate a sine wave signal, based on a first input signal of a first period;
   a cosine wave generator configured to generate a cosine wave signal, based on the first input signal;
   a first calculator configured to calculate a phase difference between the sine wave signal and a second input signal of a second period;
   a second calculator configured to calculate a phase difference between the cosine wave signal and the second input signal;
   a first selection unit configured to output, as a phase error, the phase difference calculated by the first calculator when the phase difference calculated by the second calculator is within a predetermined range, and outputs, as the phase error, a predetermined value having a same sign as a sign of the phase difference calculated by the first calculator when the phase difference calculated by the second calculator is out of the predetermined range; and
   a clock generator configured to generate a clock, using the phase error.

6. The optical disc device according to claim 5, further comprising:
   a timing generation circuit configured to output a timing signal "1" when the phase error as the output of the first selection unit is substantially 0, and outputs a timing signal "0" when the phase error as the output of the first selection unit is not substantially 0;

a low-pass filter configured to output a value obtained by smoothing the phase error output by the first selection unit when the timing signal is "0", and hold and output the value obtained by smoothing the phase error when the timing signal is "1"; and
a second selection unit configured to output input from the low-pass filter when the timing signal is "1", and outputs the phase error output by the first selection unit when the timing signal is "0",
wherein the clock generator generates the clock, using the output of the second selection unit.

* * * * *